INVENTOR.
WILLIAM BINFORD ELAM
BY
Frank P. Presta
ATTORNEY

United States Patent Office 3,263,825
Patented August 2, 1966

3,263,825
TUBE HANDLING APPARATUS
William Binford Elam, Oakland, N.J., assignor to American Can Company, New York, N.Y., a corporation of New Jersey
Filed June 10, 1964, Ser. No. 373,999
10 Claims. (Cl. 214—1)

The present invention relates to the feeding of spirally wound or other types of tubes to a tube cutting machine, and more particularly to apparatus for preventing bouncing or unnecessary movement of the tubes as they are transferred to supporting members or mandrels of the tube cutting machine to thereby prevent jamming of the tubes against these supporting members.

In the feeding of spirally wound or other types of fiber tubes to a tube cutting machine, the tubes normally are fed, one at a time, from a feed table into a feed trough of the cutting machine. As each tube enters the feed trough, it is engaged by a pusher device and advanced axially in the trough onto a mandrel or cylindrical supporting member in alignment therewith and having a diameter slightly smaller than the inside diameter of the tube. If the tube should bounce during the axial advancement thereof by the pusher device, there is the possibility that the forward end of the tube could catch or jam against the end of the mandrel as it leaves the trough. This will result in damage to the tube in engagement with the mandrel and jamming of the tubes on the feed table, with a consequent loss of time in the operation of the cutting machine and in subsequent operation to be performed on the tubes.

Various means have heretofore been utilized to prevent the bouncing of the tubes as they are advanced in the feed trough, but none of these have proved entirely satisfactory. For example, air blasts have been directed against the tubes in the feed trough and, while this reduces the degree of bouncing of the tubes, there is still some undesirable movement of the tubes in the trough which results in occasional jamming of the tubes in the cutting machine. Also, spring-loaded fingers or similar devices have been utilized to steady the tubes in the trough, but these fingers require a timing mechanism to move them into and out of engagement with each tube in the trough so as not to interfere with the axial movement of each tube in the trough or with the advancement of the pusher device in engagement with the trailing end of the tube.

The instant invention provides apparatus for effectively preventing bouncing of tubes in the feed trough of a tube cutting machine, which apparatus possesses none of the aforementioned disadvantages. This is accomplished by providing one or more generally circular brushes rotatably mounted above the feed trough of the tube cutting machine. The brushes are so positioned as to engage the leading tube on the feed table and advance it into the feed trough and to thereafter remain in continuous engagement with the tube in the feed trough to prevent it from bouncing as it is advanced axially by the pusher device onto the adjacent mandrel. Each brush is provided with bristles of sufficient length and flexibility to prevent bouncing of the tube in the trough and to allow the pusher device to pass through them without interference, while still holding the tube down against the trough.

It is accordingly an object of the present invention to provide apparatus for preventing unnecessary movement of an article as it is moved in a receptacle toward and onto a supporting member which is part of a machine for performing an operation on the article.

It is another object to provide apparatus for preventing the bouncing of a tube as it is advanced axially in a feed trough onto a mandrel of a cutting machine.

A further object is to provide such an apparatus which also serves to advance the tube from a feed table into the feed trough of the cutting machine.

Still another object is to provide such an apparatus which does not interfere with the operation of a pusher device used to axially advance the tube in the feed trough.

A still further object is the provision of apparatus for continuously engaging a spirally wound tube in a feed trough for a tube cutting machine for the purpose of preventing bouncing of the tube as it is advanced axially in the trough by a pusher device toward a mandrel for the cutting machine to thus insure the smooth transfer of the tube from the trough onto the mandrel and to prevent jamming of the tube against the adjacent end of the mandrel.

Numerous other objects and advantages of the present invention will be apparent as it is better understood from the following description, which, taken in connection with the accompanying drawings, discloses a preferred embodiment thereof.

Referring to the drawings:

FIG. 3 is a partial front elevational view taken substantially along line 3—3 of FIG. 1.

Figure 1:
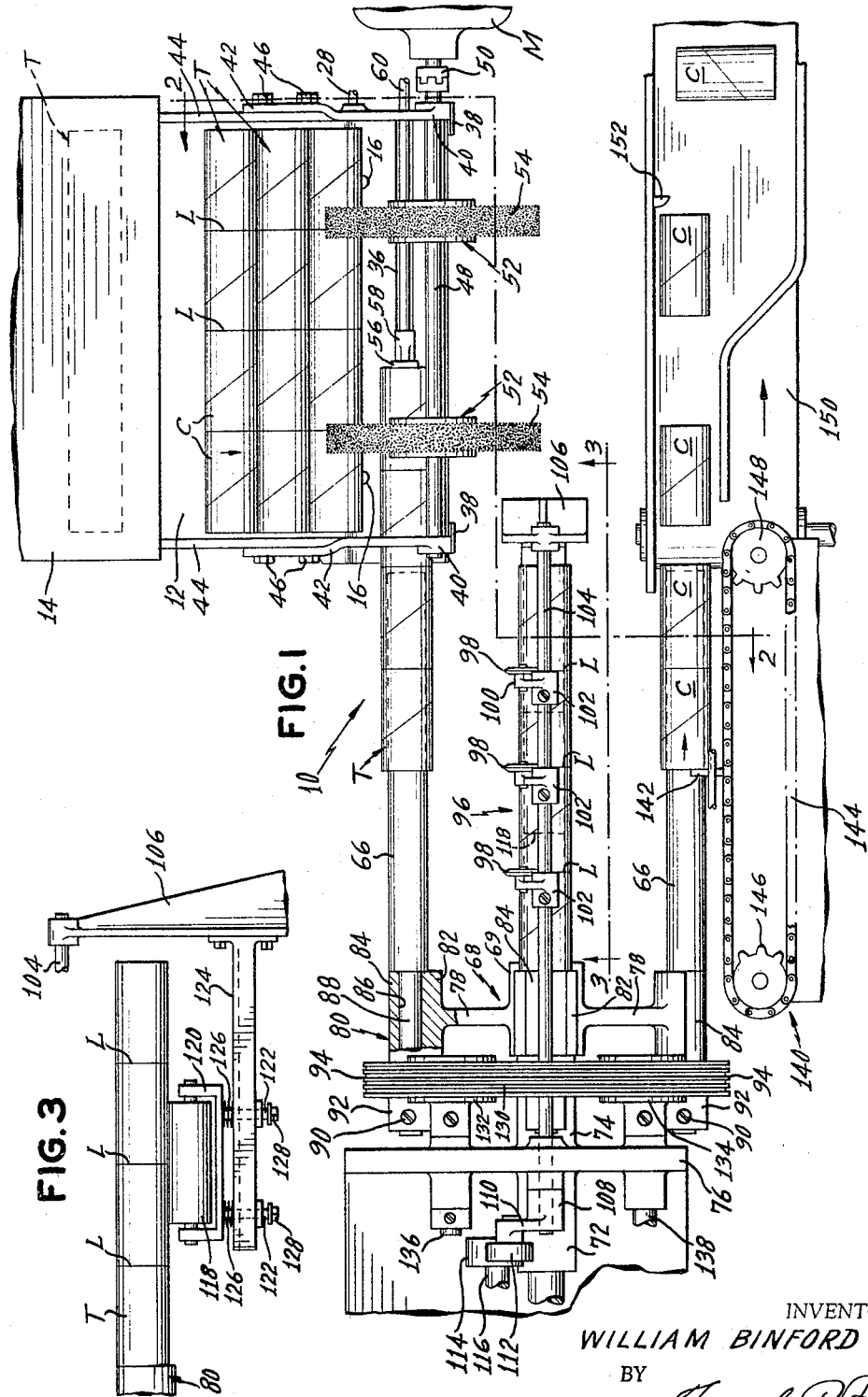
FIGURE 1 is a plan view of tube handling and cutting apparatus constructed according to the principles of the instant invention.

As a preferred or exemplary embodiment of the instant invention, FIG. 1 illustrates apparatus 10 for handling and cutting spirally wound or other type fiber tube sections T. Each of the fiber tube sections T comprises a predetermined number of labelled container bodies C separated by lines of potential severance L which may be printed on the body labels. The tube sections T are fed onto an inclined feed table 12 in any suitable manner from a conveyor or other type mechanism 14 of any suitable or conventional construction.

Figure 2:
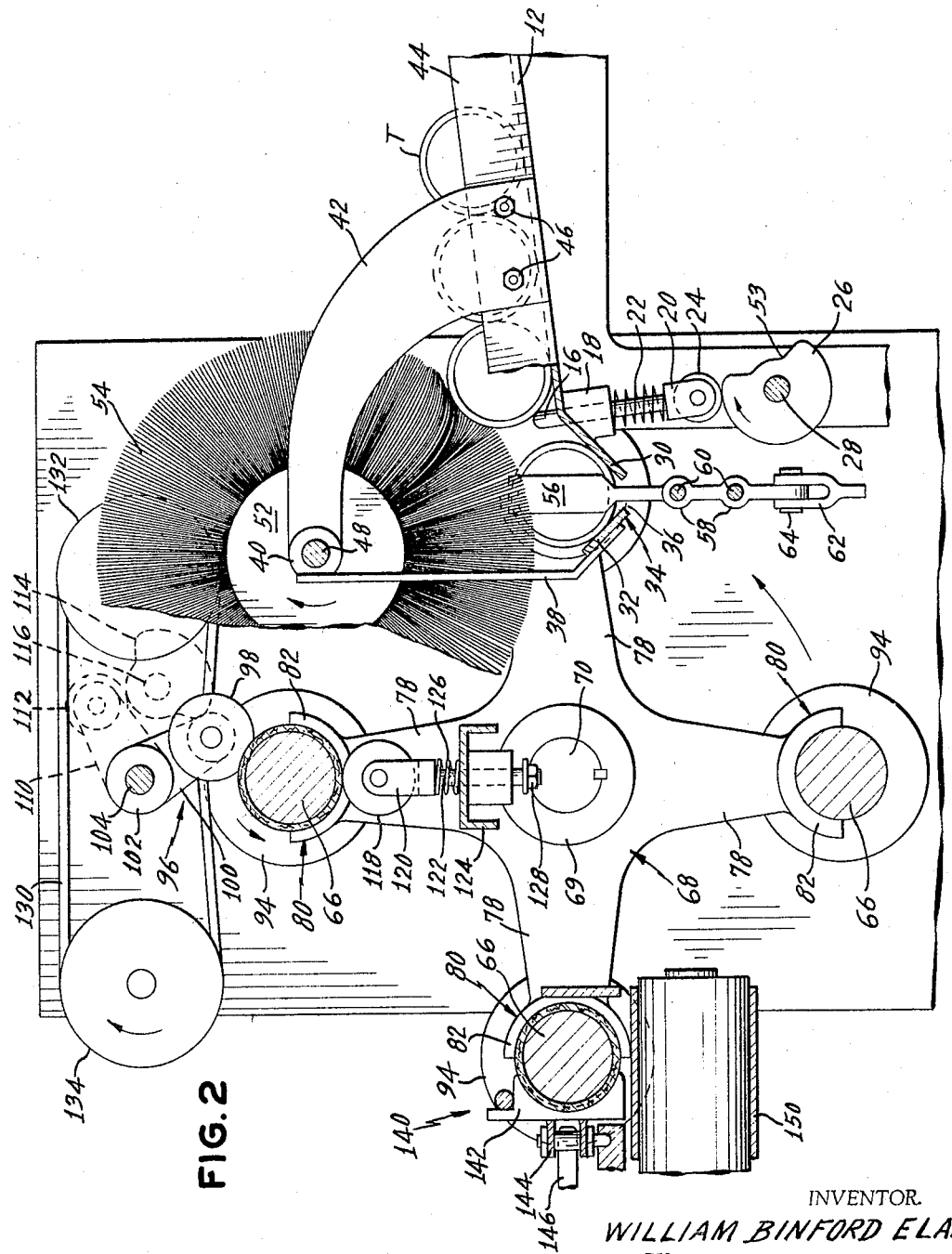
FIG. 2 is an enlarged sectional view taken substantially along line 2—2 of FIG. 1.

A pair of stop pins 16 are disposed adjacent the lower end of the feed table 12 and each is slidably mounted for substantially vertical movement within a guide member 18 mounted on the undersurface of the feed table 12. As shown in FIG. 2, each of the stop pins 16 has a generally U-shaped clevis 20 rigidly attached to the lower end thereof, and a coil spring 22 surrounds the lower end of each pin 16 and disposed between the guide member 18 and the clevis 20 to normally urge the pin 16 downwardly to a position wherein the upper end of the pin is disposed below the feed table 12. A roller 24 is rotatably mounted on each of the clevises 20 and is in engagement with a cam member 26 which is mounted on a rotatable shaft 28. The cam member 26 and shaft 28 are rotatable by any suitable means (not shown) to cause the stop pins 16 to move upwardly at predetermined times against the force of the spring 22 to a posiiton above the feed table 12 to thereby prevent tube sections T on the feed table from being removed from the lower end thereof.

As shown in FIG. 2, the lower end of the feed table 12 is provided with a depending ramp portion 30. Disposed in spaced relation to the ramp portion 30 is an elongated, inclined plate 32 which defines with the ramp portion 30 an elongated, generally V-shaped feed trough 34 having a bottom longitudinal opening or slot 36 therein. The inclined plate 32 is supported by a pair of support plates 38 which are rigidly attached thereto at the lower ends thereof. The upper ends of the support plates 38 are rigidly attached in any suitable manner to bearing portions 40 formed on the upper end of a pair of generally curved brackets 42 which are secured at the other ends thereof to opposite side walls 44 of the feed table 12 in any suitable manner such as by threaded bolts 46.

Rotatably mounted within the bearing portions 40 of the brackets 42 is a shaft 48 which is rotatably driven preferably continuously and at uniform speed, in any suitable manner, such as by a motor M through a suitable drive connection 50. A pair of circular brushes 52 are secured in spaced relation onto the shaft 48 for rotation therewith and, as seen in FIG. 2, the brushes 52 are so positioned with respect to the feed table 12 and the feed trough 34 as to engage the upper portion of the tube section T disposd adjacent the stop pins 16 on the feed table 12 and to engage the upper portion of the tube section T disposed in the feed trough 34. The bristles 54 of the brushes 52 preferably are formed of nylon or a similar material and are of a predetermined length so as to be sufficiently flexible to relatively firmly engage each tube section T adjacent the stop pins 16 and in the feed trough 34 without damaging them.

When the shaft 48 and brushes 52 are rotated in a clockwise direction (as seen in FIG. 2) by the motor M, the brushes 52 urge the leading tube section T in the feed trough 12 against the stop pins 16 and maintain the tube section in this position until the stop pins 16 ride onto the low spots 53 of the cams 26 and are moved downwardly at predetermined times by the springs 22. After the stop pins 16 are moved out of blocking relation to the leading tube section T on the feed table 12, the brushes 52 urge the leading tube section T downwardly along the feed table 12 and into the feed trough 34. The brushes 52 thereafter continuously engage the upper portion of this tube section T in the feed trough 34 and constantly maintain it against the depending ramp portion 30 of the feed table 12 and the inclined plate 32 to prevent any bouncing or undesirable movement of the tube T in the feed trough 34. Simultaneously, the brushes 52 engage the next tube section T which has rolled downwardly on the feed table 12 and maintain it against the feed pins 16 which have again been moved upwardly and in blocking relation to the tube sections T on the feed table by the cam members 26.

In order to axially advance the tube section T in the feed trough 34, a reciprocating pusher device or plate 56 extends upwardly through the slot 36 and into the feed trough 34 (see FIGS. 1 and 2). The pusher plate 56 is secured to or has formed integral therewith adjacent the lower end thereof a pair of vertically spaced, generally cylindrical bearing members 58 which are slidably mounted on a pair of vertically spaced, rigidly mounted shafts 60. A forked actuating member 62 is pivotally secured at its upper end to a pin 64 to the lower end of the pusher plate 56, and is secured at its lower end to any suitable or conventional drive mechanism (not shown) for slidably moving the pusher plate 56 into engagement with an end of the tube section T disposed within the feed trough 34. The operation of the pusher plate drive mechanism is controlled by a suitable control system (not shown) so that the pusher plate 56 engages a tube section T after it is received within the feed trough 34 and axially advances the tube section T out of the feed trough 34, while the stop pins 16 prevent the tube sections on the feed table 12 from entering the trough 34 as the pusher plate 56 is advancing therethrough. The brushes 52 in contact with each tube section T in the feed trough 34 prevent the tube section from bouncing in the trough as it is advanced axially there by the pusher plate 56, and the bristles 54 of the brushes 52 are sufficiently long and flexible so as to allow the upper portion of the pusher plate 56 protruding above the tube section T to easily pass therethrough (see FIG. 2). The brushes, therefore, serve to prevent each tube section T in the trough 34 from bouncing or moving in other than an axial direction therein, without interfering with the axial movement of the tube section T or the reciprocation of the pusher plate through the feed trough 34.

Since each tube section T is prevented from bouncing or moving in other than an axial direction within the feed trough 34 by the brushes 32 in contact therewith, it is axially advanced by the pusher plate 56 out of the feed trough 34 and onto the adjacent one of four mandrels 66 mounted on a rotatable turret member 68, without any danger of the leading end of the tube section T contacting or jamming against the front end of the adjacent mandrel 66. The turret member 68 is provided with a hub 69 that is keyed to a central shaft 70 which in turn is rotatably mounted within bearing members 72, 74 rigidly mounted on a supporting frame 76. The shaft 70 is rotated by any suitable or conventional drive means (not shown) and the rotary movement of the turret member 68 is synchronized with the reciprocation of the pusher plate 56 in any suitable manner such that the mandrels 66 are moved into predetermined alignment with the feed trough 34 to receive thereon the tube sections T being advanced axially out of the trough 34 by the pusher plate 56.

Extending radially outwardly from the hub 69 of the turret member 68 and rigidly connected thereto or formed integral therewith are four arms 78 spaced approximately 90 degrees apart. Each of the arms 78 terminates at its outer end in a bearing member 80 comprising two integrally formed, semi-cyclindrical sections 82, 84 of different radii and a central bore 86. Each of the mandrels 66 has a reduced end portion 88 which is rotatably mounted within the central bore 86 of the corresponding bearing member 80. The mandrel end portion 88 extends through the bore 86 and is connected by a pin 90 to the hub 92 of a roller or pulley 94, the purpose of which will be described more fully hereinafter.

As each tube section T is advanced by the pusher plate 56 out of the feed trough 34 and onto the adjacent mandrel 66, the leading end of the tube section T engages the enlarged section 82 of the adjacent bearing member 80. The tube section T then is completely supported by the mandrel 66 and is fully removed from the feed trough 34. Thereafter, the turret member 68 is rotated in a counterclockwise direction (as seen in FIG. 2), and the pusher plate 56 is slidably moved towards the opposite end of the feed trough 34 (to the right as seen in FIG. 1) so that another tube section T may be received in the feed trough 34 from the feed table 12.

The tube section T on the mandrel 66 is rotated approximately 90 degrees in a counterclockwise direction to a cutting station 96 wherein a plurality of cutting knives 98 are so positioned with respect to the tube section T as to be adapted to cut it into separate container bodies C along the lines of severance L (see FIG. 1). Each of the rotary cutting knives 98 is rotatably mounted on an arm 100 rigidly secured to a hub 102 which is in turn secured to a shaft 104. The shaft 104 is rotatably mounted at one end on a supporting plate 106 and at the other end on the supporting frame 76. The other end of the rotatable shaft 104 has a hub portion 108 on one end of a bracket 110 rigidly secured thereto. A roller 112 is rotatably mounted on the other end of the bracket 110 and is in engagement with a cam member 114 secured to a shaft 116 that is rotatably driven in any suitable or conventional manner. The rotation of the cam member 114 is synchronized with the rotation of the turret member 68 in any suitable manner so as to rotate the shaft 104 in a clockwise direction to move the cutting knives 98 into engagement with the tube section T on the mandrel 66 when the mandrel 66 is in a predetermined position at the cutitng station 96.

As the turret member 68 is rotating the mandrel 66 and the tube section T thereon toward the predetermined position at the cutting station 96, the lower portion of the tube section T is engaged by a pressure roller 118 (see FIGS. 2 and 3) to maintain the tube section T in engagement with the mandrel 66 during the cutting operation. The roller 118 is rotatably mounted in a U-shaped bracket 120 which has rigidly secured thereto a pair of depending rods 122 extending through apertures in a support plate 124 which is secured in perpendicular relation to the support plate 106. A pair of coil springs 126 surround the rods 122 and are disposed between the U-shaped bracket 120 and the supporting plate 124 to normally urge the roller 118 upwardly in a substantially vertical direction. A pair of nut and washer assemblies 128 are secured to the lower ends of the rods 122 in order to retain the U-shaped bracket 120 on the support plate 124.

It will be readily seen, therefore, that the roller 118 is so positioned as to engage the lower portion of the tube section T as it is moved in a counterclockwise direction with the mandrel 66 into a predetermined position in the cutting station 96. Since the roller 118 is moved downwardly against the force of the springs 126 when it engages each tube section T, the roller 118 is resiliently urged into contact with each tube section T during the cutting operation.

In order to rotate the mandrel 66 and thus the tube section T mounted thereon before they reach the cutting station 96 and before the cutting knives 98 are moved into contact with the tube section T, a drive belt 130 is mounted on a pair of rollers 132 and 134 which are secured to shafts 136 and 138, respectively, which in turn are rotatably mounted on the supporting frame 76. The shaft 138 is rotatably driven by any suitable means (not shown) and thus the drive belt 130 is constantly rotated in a clockwise direction (as seen in FIG. 2) on the rollers or pulleys 132 and 134. The lower portion of the drive belt 130 is so positioned as to be engaged by the roller or pulley 94 secured to the end portion 88 of each mandrel 66 as the mandrel and tube section T thereon are moved toward the predetermined cutting position as seen in FIG. 2. When the roller 94 engages the lower portion of the drive belt 130, the roller 94 is rotated in a counterclockwise direction (as seen in FIG. 2) to thus rotate both the mandrel 66 and the tube section T thereon, which section T is pressed against the mandrel 66 by the roller 118, in a similar direction.

When each rotating mandrel 66 and tube section T thereon reach the predetermined cutting position shown in FIG. 2 and the tube section T is gripped by the roller 118, the cam member 114 is rotated to a position to pivot the supporting brackets 100 in a clockwise direction and to thus move the cutting knives 98 mounted thereon into engagement with the lines of severance L on the tube section T. The turret member 68 will remain stationary for a period of time sufficient for the tube section T to be rotated through approximately 360 degrees in the cutting station 96 so that the knives 98 will completely sever the tube section T along the lines of severance L into separate container bodies C.

When the cutting operation is completed, the knives 98 are moved away from the container bodies C on the mandrel 66 and the turret member 68 is again rotated in a counterclockwise direction through an angle of approximately 90 degrees to move the severed tube section or container bodies C on the mandrel 66 to an exit station 140. At the exit station 140, a pusher member 142, mounted on a moving endless chain 144 supported on a drive sprocket 146 and an idler sprocket 148, engages the end portion of the innermost container body C disposed adjacent and in contact with the bearing member 80 and axially advances the container bodies C off the mandrel 66 and onto a conveyor belt 150. The conveyor belt 150 moves the container bodies C towards a stationary turning device 152 which turns each container body through approximately a 90 degree angle so that the longitudinal axis of each container body is approximately perpendicular to the direction of advancement of the conveyor belt 150. The container bodies C are then moved on the conveyor belt 150 and gravity fed to apparatus for performing other operations on the container bodies, such as end flanging and seaming or the like.

It is to be noted that, while the instant invention is described with respect to the axial advancement of a tube in a feed trough onto the mandrel of a cutting machine, it is equally well adapted for use with any type of article handling apparatus and wherein an article is to be moved only in a predetermined direction. Also, the present invention is not to be limited only to rotatable brushes having a circular shape. It is obvious that, with certain types of article transfer apparatus different from that shown and described herein, non-rotatable brushes having various shapes other than circular could be utilized to prevent the articles from moving in other than a predetermined direction. Furthermore, any number of brushes could be utilized depending on the length and shape of the article, and the brush or brushes could be of any suitable construction and formed of any suitable material or materials, without departing from the spirit and scope of the instant invention.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:
1. Apparatus for handling a tube, comprising:
a trough in which the tube is axially slidable,
means for axially moving the tube in said trough, and
a brush, said brush having elongated bristles in engagement with the tube to urge said tube against said trough to prevent it from moving in other than an axial direction when it is moved in said receptacle by said moving means.

2. The apparatus of claim 1 wherein said brush is generally circular in shape and is mounted for rotary movement.

3. The apparatus of claim 2 wherein said brush is mounted for rotation about an axis that is substantially parallel to the longitudinal axis of the tube.

4. Apparatus for handling a tube comprising a trough, a mandrel, said mandrel having an outside diameter less than the inside diameter of said tube and being aligned with said trough so that said tube can be slid through said trough in an axial direction and onto said mandrel, a brush, said brush being in contact with said tube to urge said tube against said trough to prevent said tube from moving in other than an axial direction thereby enabling said tube to be moved onto said mandrel without jamming against the end thereof.

5. Apparatus for transferring a tube from an elongated trough onto a generally cylindrical mandrel having a diameter slightly less than inside diameter of said tube, said apparatus comprising pusher means engaging one end of the tube and extending beyond the periphery of the tube for pushing said tube in an axial direction in the trough towards said mandrel, flexible means for substantially continuously engaging said tube so as to urge said tube against said trough to prevent said tube from moving in other than an axial direction, said flexible means being so constructed and arranged as to allow said pusher means to pass thereby in engagement therewith without interfering with said pusher means.

6. An apparatus wherein a tube is to be transferred from a feed table into an elongated feed trough and then unto a generally cylindrical mandrel having a diameter slightly less than the inside diameter of said tube and wherein said tube is slidable in the trough for movement in an axial direction, the improvement comprising a generally circular brush mounted adjacent the feed trough and having the bristles thereof in engagement with the outer surface of said tube to urge said tube against said trough to prevent said tube from moving in other than an axial direction in said feed trough.

7. In an apparatus wherein a tube is to be transferred from an elongated feed trough onto a generally cylindrical mandrel having a diameter less than the inside diameter of the tube and wherein the tube is slidable in an axial direction the improvement comprising a generally circular brush having relatively long bristles formed of nylon said brush mounted adjacent to the feed trough and having the bristles thereof in engagement with the outer surface of the tube to urge said tube against said trough to prevent said tube from moving in other than an axial direction in the feed trough.

8. The apparatus of claim 4 wherein said brush is rotatably mounted and is generally circular in shape, and wherein said brush is in continuous engagement with the tube as it is axially moved from the trough onto the mandrel.

9. The apparatus of claim 5 wherein said flexible means comprises a brush having the bristles thereof in engagement with the outer surface of the tube.

10. The apparatus of claim 9 wherein said brush is circular in shape and is mounted for rotation about an axis which is substantially parallel to the longitudinal axis of the tube in the receptacle.

References Cited by the Examiner

UNITED STATES PATENTS

| | | | |
|---|---|---|---|
| 1,415,258 | 5/1922 | Nelsen | 15—70 |
| 1,891,331 | 12/1932 | Lord | 15—77 |
| 2,301,674 | 11/1942 | Andrews | 214—1 |
| 2,597,946 | 5/1952 | Olson | 15—70 |
| 2,674,779 | 4/1954 | Herzog | 214—1.5 |
| 2,950,671 | 8/1960 | Allen | 214—1 X |
| 3,128,875 | 4/1964 | Kay | 198—221 |
| 3,180,481 | 4/1965 | Brause | 198—167 |

MARVIN A. CHAMPION, *Primary Examiner.*